April 15, 1952 R. WATTS 2,593,372
SHOCK ABSORBER
Filed Dec. 19, 1947 4 Sheets-Sheet 1

INVENTOR.
Raymond Watts
BY
Atty.

April 15, 1952  R. WATTS  2,593,372
SHOCK ABSORBER
Filed Dec. 19, 1947  4 Sheets-Sheet 3

INVENTOR.
Raymond Watts
BY
Atty.

April 15, 1952 R. WATTS 2,593,372
SHOCK ABSORBER
Filed Dec. 19, 1947 4 Sheets-Sheet 4

INVENTOR.
Raymond Watts
BY

Patented Apr. 15, 1952

2,593,372

UNITED STATES PATENT OFFICE 2,593,372

SHOCK ABSORBER

Raymond Watts, Chicago, Ill., assignor to American Steel Foundries, Chicago, Ill., a corporation of New Jersey Application December 19, 1947, Serial No. 792,667

21 Claims. (Cl. 267—64)

This invention relates to shock absorbers and more particularly to a novel hydraulic shock absorber such as is frequently utilized in the landing gear of aircraft.

The instant application is a continuation-in-part of my co-pending application, Serial No. 523,019, filed February 19, 1944, in the United States Patent Office and issued as Patent No. 2,471,294 on May 24, 1949.

A general object of the present invention is to provide a shock absorber, such as above described, wherein means are provided externally of the absorber for adjusting the friction developed thereby.

Another object of the invention is to provide a pressure sensitive compressible metering unit adapted to expand and contract to automatically vary the metering orifice area in response to variations in the presence of the metered fluid and to provide means for adjustably compressing the unit thereby adjusting the orifice area to a predetermined value for a given pressure on the metered fluid.

Still another object of the invention is to provide a novel actuating mechanism for the metering unit including a piston and cylinder device operatively associated with the unit and actuated by pressure fluid from a source disposed externally of the shock absorber.

Still another object of the invention is to devise a shock absorber, such as above described, wherein the orifice area is yieldingly controlled by a compressed gas spring to accommodate automatic adjustment of the orifice area in response to variations of the pressure therein.

A further object of the invention is to devise a system wherein the friction absorbing characteristics of the shock absorber may be readily regulated by the operator as, for example, from the cockpit of an aircraft.

Still another object of the invention is to provide in a shock strut, such as above described, a simple and efficient pressure responsive metering unit which may be readily fabricated and easily installed in the shock absorber.

The foregoing and other objects and advantages of the invention will become apparent from a consideration of the following specification and the accompanying drawings, wherein:

Describing the invention in detail and referring first to the embodiment thereof illustrated in Figures 1 to 4, the shock strut comprises a piston 2 (Figure 1) adapted for pivotal connection in conventional manner to an associated aircraft wheel and axle assembly (not shown). The piston is reciprocal within a cylinder 8 to define a high pressure chamber 10 with a wall or bulkhead 12 of the cylinder suspended, as hereinafter described in detail, by a perforated tube 14 carried by a top wall or bulkhead 16 of the cylinder within a low pressure chamber 18 thereof.

Figures 1, 7:
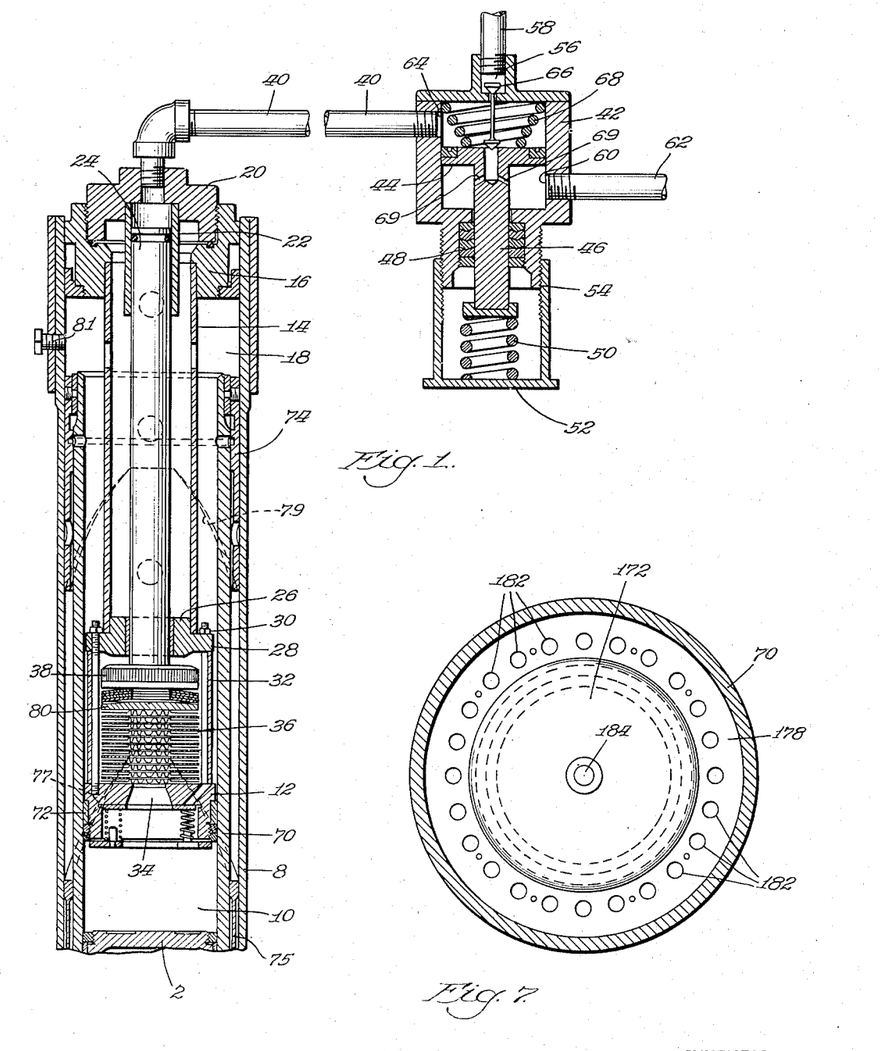
Figure 1 is a fragmentary longitudinal sectional view partly in elevation of a shock strut and associated pneumatic actuating mechanism for the metering device.
Figure 7 is a top plan view of the structure shown in Figure 6.

The top wall 16 is provided with a removable threaded plug 20 carrying a cylinder 22 which receives the upper end of a piston 24. The piston extends through a complementary bearing carried by a collar 26 mounted on the lower end of the tube 14. The collar 26 comprises ears 28 connected by bolts 30 and spacers 32 to the bulkhead 12 which is provided with a central opening or orifice 34 through which the hydraulic fluid is forced on the closure stroke of the device as the piston 2 urges the fluid from the high pressure chamber 10 into the low pressure chamber 18.

The fluid is metered by a compressible resilient unit, generally designated 36, and adjustably compressed by an abutment 38 on the lower end of the piston 24 which is actuated by pneumatic fluid admitted to the cylinder 22 by a line 40.

The pressure of the pneumatic actuating fluid in the line 40 and the cylinder 22 is regulated by a valve mechanism including a body 42 with a spool or piston 44 slidably reciprocal within a complementary bore in the body in fluid-tight engagement therewith. The piston 44 is provided with a stem 46 extending through a conventional packing gland 48 for actuation by a spring 50 adjustably compressed against the stem 46 by a cap 52 in threaded engagement at 54 with the body 42. The body comprises an inlet port 56 connected to a high pressure line 58 supplied with high pressure fluid by any suitable source, such as a pump or accumulator (not shown).

The body also comprises a discharge or relief port 60 connected to a discharge or return line 62, and the body also comprises an outlet port 64 connected to the line 40 for conveying pneumatic fluid thereto under a predetermined pressure regulated by the spring 50 and spring cap 52. The piston 44 cooperates with a valve element 66 to open the same when the pressure in the line 40 reaches a predetermined minimum value and to release the valve element 66 thereby enabling the same to close when the pressure in the line 40 reaches a predetermined intermediate value, both of said values being dependent upon the adjustment of the spring 50 and upon a balancing spring 68 compressible between the top of the position 44 and the body 42. Upon development of a premaximum value in the line 40, the piston 44 is urged to its discharge position whereat the pneumatic fluid is permitted to flow through ports 69 into the discharge line 62 until the pressure in the line 40 is bled off sufficiently to allow the piston 44 to close the port 60 against communication with the port 64.

Thus it will be understood that by adjustment of the cap 52 any desired predetermined pressure value may be maintained in the line 40 and the cylinder 22, the above-described pressure regulating mechanism being diagrammatic for the sake of simplicity.

It may be noted that pressure on the unit 36 is preferably substantially constant thereby affording a more uniform deceleration of the closure stroke of the strut than has been possible in arrangements heretofore proposed. This is an important aspect of the invention, inasmuch as the maximum load factor may occur at any point throughout the full extent of the shock absorber stroke in landing gear arrangements.

The piston 2 is provided with an extension 70 slidably fitted around a bearing 72 carried by the bulkhead 12 and the extension 70 carries a bearing 74 adjacent its upper end slidably fitted within the cylinder 8 thereby affording a structure of relatively great mechanical strength.

It may be noted that the piston is also slidably engaged with a bearing 75 secured in any convenient manner, as by welding or bolts, to the cylinder 8, the upper end of the bearing 75 having an upwardly extending projection 77 at each side thereof receivable within a complementary recess 79 in the lower end of the bearing 74 in the fully extended position of the strut to maintain the piston 2 and cylinder 8 in a predetermined position whereat the landing gear wheel (not shown) is in its proper castoring position as the wheel is subjected to shock thereby initiating the compression stroke of the strut during landing operation.

The low pressure chamber 18 is provided with a fitting 81 adjacent the upper end of said chamber to admit a compressed gas, such as air, at a predetermined pressure value thereby affording an air spring acting on the upper surface of the hydraulic liquid within the strut to yieldingly resist closure of the same and to return the strut to its extended position upon the release of forces effecting the closure stroke.

The metering unit 36, as above noted, is adjustably compressed by the piston 24 and, as will be understood by the following description of this unit, the friction developed thereby is directly proportional to the pressure exerted thereagainst by the piston 24 so that the operator, by adjustment of the above-described valve mechanism which is preferably located in the cockpit of the aircraft, may adjust the shock strut to afford any desired frictional characteristics prior to a landing operation.

Figures 2, 9:
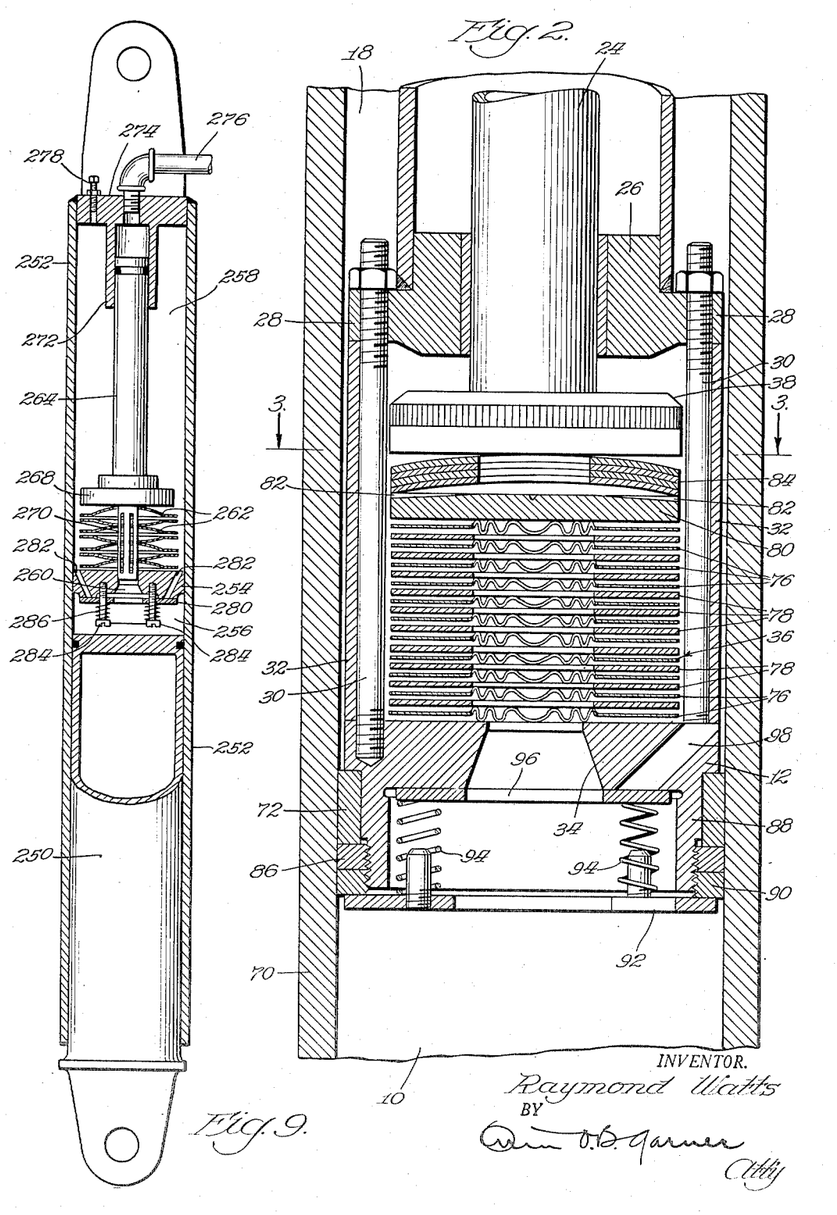
Figure 2 is an enlarged fragmentary view of the structure shown in Figure 1 illustrating the metering device and actuating means in detail.
Figure 9 is a fragmentary longitudinal sectional view partly in elevation of a shock strut embodying still another modification of the invention.
Figure 3:
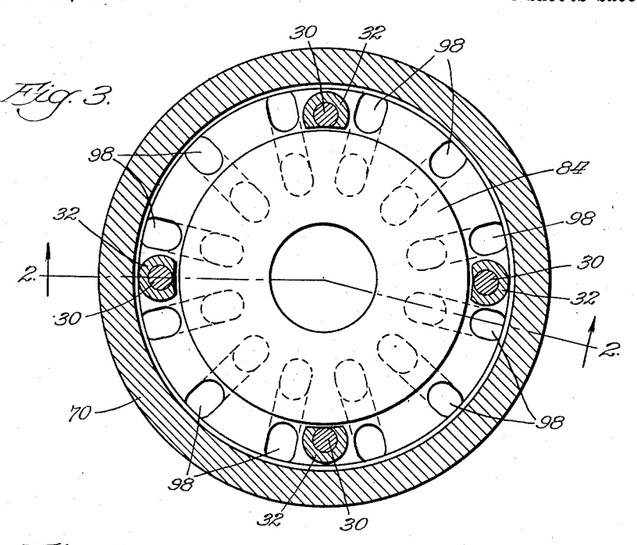
Figure 3 is a cross sectional view on the line 3—3 of Figure 2.
Figure 4:
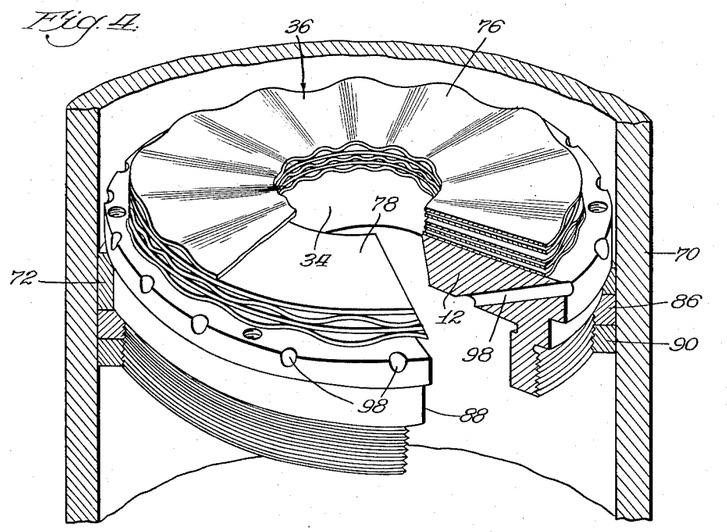
Figure 4 is a perspective view of the metering device with portions broken away.

The resilient unit 36 is shown in detail in Figures 2 to 4, inclusive, wherein it will be seen that this unit comprises a plurality of annular, radially fluted, resilient discs 76 alternately arranged with a plurality of annular rigid discs 78, the central openings of said discs being aligned with the port 34 to define a longitudinal axial passage through the unit 36 communicating with the low pressure chamber 18 through radial passages or interstices between the discs. On the top of the stack of discs is a spring plate or abutment 80 having a plurality of radial notches 82, as best seen in Figure 2. The abutment 80 affords a seat for a stack of Belleville springs 84 which bear against the abutment 38 actuated, as above described, to compress the resilient unit including the plates 76 and 78, the abutment 80 and the springs 84 against the wall 12.

As best seen in Figures 2 and 4, the bearing 72 is secured to the wall 12 by a collar 86 threaded on a depending annular flange 88 of said wall, another collar 90 also being threaded on said flange to afford support for a spring plate 92 carrying springs 94 urging an annular flapper valve plate 96 against the bottom of the wall 12 to close by-pass ports 98 therethrough. Thus the plate 96 affords a by-pass valve mechanism accommodating unmetered flow of fluid from the low pressure chamber 18 to the high pressure chamber 10 on the release or extension stroke of the strut. It will be understood that on the closure stroke of the strut the resilient unit 36 expands and contracts to increase and decrease the axial breadth or area of the metering interstices between the plates 76 and 78 in response to variations in the pressure of the fluid forced through the port 34. This expansion and contraction is accomplished partly by the resiliency of the discs 76, partly by the Belleville springs 84, and partly by yielding of the compressed gas spring within the cylinder 20. Thus the pressure value of the gas within the cylinder 20 controls the total metering area of the interstices between the plates 76 and 78 for any given pressure value of the hydraulic fluid flowing therethrough. It will be understood that if desired the Belleville springs 84 may be eliminated and preferably a few more plates 76 and 78 added to compensate for the removal of the Belleville springs.

It may be noted that during expansion and contraction of the resilient unit 36 the resulting oscillation of the Belleville springs 84 is damped by fluid trapped between the plates and the abutment 80 and metered through the radial notches 82 which are preferably V-shaped in cross section.

Figure 5:
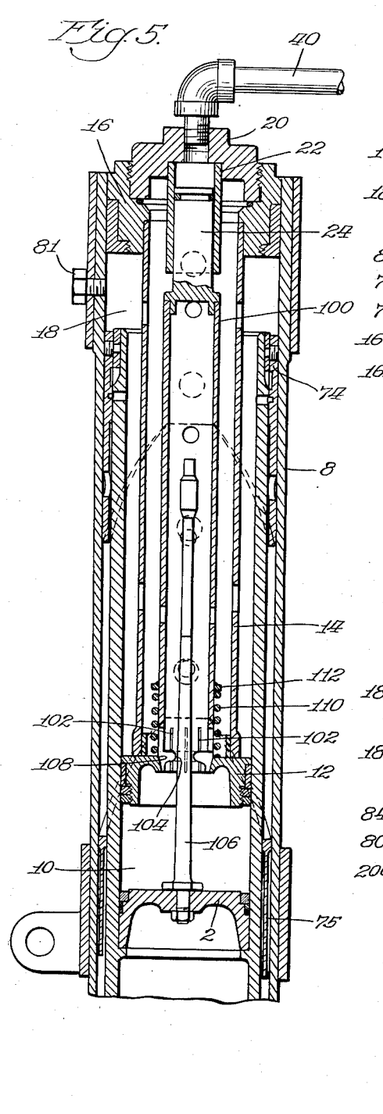
Figure 5 is a fragmentary longitudinal sectional view, partly in elevation, of a modified strut embodying the invention.

Referring now to Figure 5, a modification of the invention is shown wherein the parts corresponding to those of Figures 1 to 4 are identified by corresponding numerals.

In the modification of Figure 5 the piston 24 is provided with a perforated tube 100, the lower end of which is axially slotted as at 102 and is provided with a passage 104 receiving the metering pin 106 carried by the piston 2.

In this modification the wall of the bulkhead 12 is connected, as by welding, to the lower end of the perforated support tube 14, and the metering orifice is defined by the passage 104 and the metering pin 106. The area of the orifice is adjusted, as in the previously described embodiment, by varying the pressure of the pneumatic actuating fluid in the cylinder 22. Thus inasmuch as the lower end of the tube 100 is tapered as at 108 for reception within a complementary tapered opening of the wall 12, downward movement of the tube 100 which is resilient causes radial contraction of the passage 104 and consequent decrease of the metering area. For this reason, the metering area is directly proportional to the pressure of the pneumatic actuating fluid in the cylinder 22.

The action of the piston 24 is yieldingly resisted by a spring 110 bearing against the wall 12 and an annular spring seat 112 carried by the tube 100. The spring 110 is operable upon diminution of the pressure in the cylinder 22 to urge the tube 100 upwardly thereby increasing the area of the metering orifice.

Figure 6:
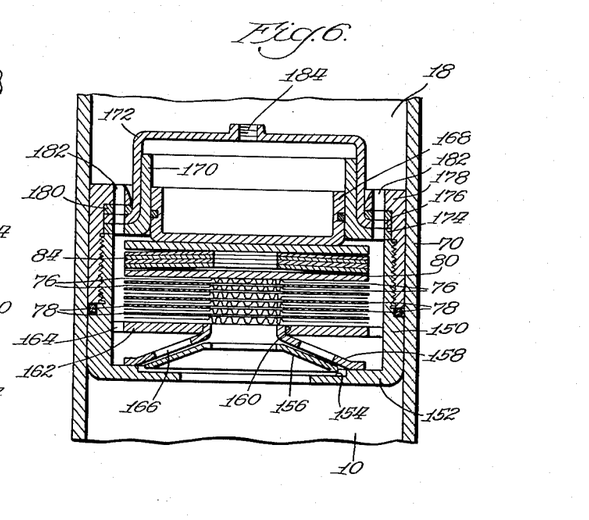
Figure 6 is an enlarged fragmentary sectional view of another modification of the invention.

Referring now to Figures 6 and 7, a modified form of metering unit is disclosed comprising a sleeve 150 having an inturned annular flange 152, preferably recessed as at 154 to afford a seat for an annular dished flapper valve plate 156. The flange 152 supports a conical valve body member 158 having flanges 160 affording positioning means for an annular spring seat or abutment 162 which is snugly fitted within the sleeve 150 and is provided with ports or passages 164 communicating with ports or passages 166 through the body member 158.

Supported on the abutment 162 is a stack of alternately arranged, resilient, fluted discs 76 and rigid discs 78 corresponding to those utilized in the embodiment of Figures 1 to 4. An abutment 80 and Belleville springs 84, also corresponding to those shown in Figures 1 to 4, are positioned on top of the stack of discs 76, 78 and are compressed thereagainst by a piston 168 having a slidable fluid-tight fit within a sleeve 170 snugly fitted within a cylindrical housing or casing 172, the sleeve 170 and casing 172 being flanged as at 174 and 176 respectively. These flanges are clamped to the sleeve 150 by a collar 178 in threaded engagement therewith. The collar 178 and the flanges 174 and 176, as well as a gasket 180 between the collar 178 and the flange 176, are provided with aligned openings defining a plurality of ports or passages 182 affording communication between the low pressure chamber 18 and the ports 164.

The metering unit above described is maintained in position by a pipe line (not shown) threaded into a complementary opening 184 in the top of the casing 172 and secured to the strut cylinder, as is the line 40 in the previously described embodiments.

Thus it will be understood that in the modification of Figures 6 and 7 on the compression stroke of the strut, the flapper valve plate 156 closes the ports 166 directing fluid through the interstices between the plates 76, 78 to effect metering of the fluid which then passes through the ports 182 into the low pressure chamber 18. On the release or extension stroke of the strut the hydraulic fluid passes from the low pressure chamber 18 through the ports 182, 164, and 166 thrusting the flapper valve plate 156 downwardly to its open position against the seat 154 to accommodate flow of the fluid into the high pressure chamber 10.

It will be understood that the strut fragmentarily shown in Figures 6 and 7 is substantially identical with that shown in Figure 1 except for the modified construction of the metering unit above described.

Figure 8:
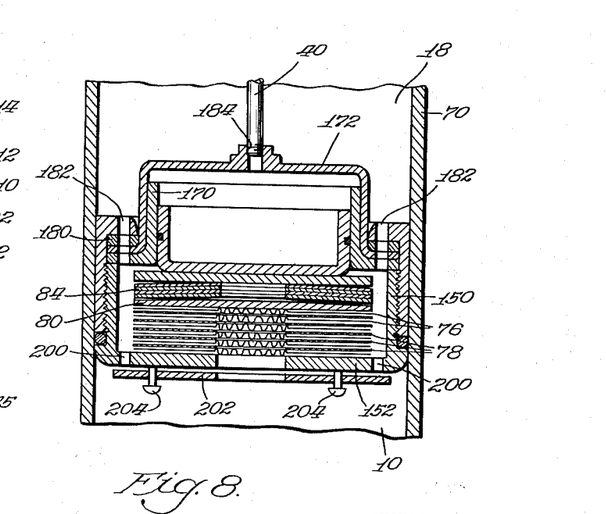
Figure 8 is a view comparable to Figure 6 but illustrating another modification of the invention.

Referring now to Figure 8, a modification of the metering unit shown in Figures 6 and 7 is disclosed wherein parts corresponding to those of Figures 6 and 7 are identified by corresponding numerals.

In the modification of Figure 8, the flange 152 of the sleeve 150 is provided with by-pass ports 200 which are closed on the compression stroke of the strut by an annular flapper valve plate 202 slidably mounted on bolts 204 secured to the bottom of the flange 152, and the stack of plates 76, 78 are seated directly against the top of the flange 152. The rest of the structure shown in Figure 8 is substantially identical with that of Figures 6 and 7.

It will be apparent that in the arrangement of Figure 8 on the compression stroke of the device the valve plate 202 is forced upwardly to its closed position over the ports 200 whereupon the hydraulic fluid is forced from the high pressure chamber 10 through the metering interstices between the plates 76, 78 and upwardly through the ports 182 into the low pressure chamber 18.

On the release stroke of the strut the hydraulic fluid flows from the low pressure chamber 18 through the ports 182 downwardly through the ports 200 forcing the plate 202 to its open position thereby accommodating substantially unmetered flow of fluid into the high pressure chamber 10.

As in the previously described embodiment, the casing 172 is provided with a threaded opening 184 for the reception of a pipe or conduit 40 which is secured to the strut cylinder in the same manner as in Figure 1 and serves to position the metering unit within the strut and also to convey pneumatic fluid thereto for the purpose of exerting an adjustable predetermined pressure against the resilient unit thereby adjustably regulating the friction absorbing characteristics thereof.

Referring now to the modification of Figure 9, the strut comprises a piston 250 reciprocal within a cylinder 252 having a bulkhead 254 dividing the cylinder into a high pressure chamber 256 and a low pressure chamber 258. The bulkhead comprises a passage or port 260 connecting the chambers. A resilient metering unit is provided comprising a plurality of reversely arranged, resilient, dished discs 262 compressed against the bulkhead 254 by a piston 264 formed with an abutment 268 carrying a perforated tube 270 which is slidably fitted within the port 260 and the central openings through the discs 262.

The piston 264 is actuated by hydraulic or pneumatic fluid within a cylinder 272 carried by the top wall or head 274 of the cylinder 252. The actuating fluid is admitted to the cylinder 252 by a line 276 which, as in the previously described embodiments, may be connected to any suitable means for adjusting the pressure within the cylinder 272. A compressed gas spring is admitted to the upper end of the cylinder 252 by a fitting 278 in the head 274.

On the compression stroke of the strut shown in Figure 9, hydraulic fluid is urged from the high pressure chamber 256 through the port 260 and radially outwardly through the metering interstices between the discs 262 into the low pressure chamber 258. Under these conditions a flapper valve plate 280 is urged to its closed position covering by-pass ports 282 in the wall 254, the plate being mounted on studs 284 carried by the wall 254.

On the release stroke of the device the hydraulic fluid passes from the low pressure chamber 258 downwardly through the ports 282 urging the annular valve plate 280 to its open position against the resistance of springs 286 carried by the bolts 284 thereby accommodating unmetered flow of the fluid to the high pressure chamber 256. In operation and referring to Figures 1-4, inclusive, the valve mechanism 42, 46 is preset to a desired predetermined pressure value and pneumatic fluid is supplied therethrough from line 58 and to line 40 to the cylinder 22 to actuate the piston 24, thereby compressing the unit 36 against the wall 12. On the closure stroke of the shock strut the piston 2 moves toward the wall 12, thereby transferring the fluid in the high pressure or working chamber 10 through the port 34 and then through the unit 36 into the low pressure or reservoir chamber 18 against the resistance of the gas spring contained therein. It will be observed that as the pressure of the fluid flowing through the unit 36 increases, whereupon the unit 36 is caused to expand by flexing the resilient plates 76 or moving plates 76 and 78 apart in order to increase the orifice area defined by these plates, the flexing of the unit 36 is controlled by the pressure of the fluid acting on the piston 24 in the cylinder 22. As the unit 36 expands the piston 24 is moved into the cylinder 22 which increases the pressure of the fluid within the cylinder 22. This pressure is immediately reduced to the initial pressure value by the valve 42, 46 which operates as hereinbefore discussed. Thus it will be seen that a constant determined pressure value is maintained in line 40 and in cylinder 22 irrespective of reciprocal movement of the piston 24.

On the extension stroke of the strut the piston moves away from the wall 12 whereupon the gas spring contained in chamber 18 causes the fluid in the low pressure chamber to flow through the ports 98 into chamber 10 by opening plate 96. Simultaneously, when the pressure of the fluid flowing through the unit 36 is reduced, whereby the piston 24 moves against the unit 36 compressing the same against the wall 12, the pressure in cylinder 22 is maintained by fluid flowing from line 58 to line 40 as regulated by the valve 42, 46.

All of the other embodiments disclosed herein operate in exactly the same manner with the exception of the embodiment shown in Figure 5 wherein during closure of the strut the fluid in chamber 10 causes the resilient lower end of tube 100 to move upwardly out of the port or opening 108, whereupon the lower end of the tube is permitted to expand and thereby enlarge the orifice area defined by the slots 102. The function of the cylinder 22 and the piston 24 is the same as in all the other embodiments. Upon expansion of the strut in Figure 5 the fluid flows into the high pressure chamber 10 from the low pressure chamber 18 through the perforated tubes 14 and 100 and opening 108 while the piston 2 moves away from the wall 12.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. An hydraulic shock absorber comprising a cylinder member with a high pressure chamber, a piston member reciprocal in said chamber, a low pressure chamber in one of the members, a port connecting said chambers, and means carried by said one member for metering hydraulic fluid flowing through said port, said means comprising an axially expansible and contractible resilient unit having an axial passage communicating with said port, and radial passage means for connecting said axial passage to the low pressure chamber, a cylinder carried by said one member, a piston in the second-mentioned cylinder bearing against said unit, a compressed gas spring in said second-mentioned cylinder adapted to compress said piston against said unit and to yieldingly resist expansion of said unit due to increase of pressure in the hydraulic fluid flowing through said passage means, said piston being movable into said cylinder to compress said gas spring during expansion of said means, and a pressure regulator connected to said cylinder for maintaining the pressure of said gas spring at a substantially constant value by exhausting the gas from said cylinder as said piston moves thereinto when said means expands whereby the load of the spring on said piston is substantially constant irrespective of the extent of expansion of said means.

2. An hydraulic shock absorber comprising a top follower in the form of a cylinder containing high and low pressure chambers, a bottom follower in the form of a piston reciprocal in the high pressure chamber, an element in said cylinder comprising a wall with a port connecting said chambers, means for metering fluid flowing through said port comprising a metering device including relatively movable parts defining an adjustable orifice area connecting said port to the low pressure chamber, a cylinder carried by the top follower, a piston reciprocal in the last-mentioned cylinder and operatively connected to said device for resisting increase of said orifice area, and means operatively connected to the last-mentioned cylinder for delivering actuating fluid thereto at an adjustable pressure value.

3. An hydraulic shock absorber comprising a top follower in the form of a cylinder containing high and low pressure chambers, a bottom follower in the form of a piston reciprocal in the high pressure chamber, an element in said cylinder comprising a wall with a port connecting said chambers, means for metering fluid flowing through said port and comprising a compressible unit with a central passage connected to said port, and a plurality of expansible and contractible passages connecting said central passage to said low pressure chamber, a piston and cylinder device carried by the top follower and operatively connected to said unit for compressing the same, and a control source of fluid operatively associated with said device for delivering pressure fluid thereto under an adjustable predetermined pressure value.

4. An hydraulic shock absorber comprising a cylinder member adapted to contain hydraulic fluid, a high pressure chamber in said cylinder member, a piston member reciprocal in said high pressure chamber, a low pressure chamber in one of said members, a flexible metering device carried by one of said members and comprising an orifice connecting said chambers, the area of said orifice being adjustable by flexing said device, a piston and cylinder assembly carried by said one member and operatively connected to said device for exerting pressure thereagainst to resist expansive flexing thereof, and a source of pressure fluid externally of said shock absorber and operatively connected to said assembly for actuating the same.

5. An hydraulic shock absorber comprising a cylinder with a high pressure chamber adapted to contain hydraulic fluid, a piston member reciprocal in said chamber, a low pressure chamber in one of said members, means for metering flow of hydraulic fluid between said chambers comprising an axially expansible and contractible unit including a plurality of elements with an axial passage connected to the high pressure chamber, said elements defining radial passage means connected to said passage and to the low pressure chamber, said elements being movable apart during expansion of said unit by the pressure of the fluid flowing through said passage means to increase the axial breadth of said passage means, and yielding means cooperatively associated with said unit and exerting a substantially constant pressure thereagainst to yieldingly resist expansion thereof.

6. An hydraulic shock absorber comprising two relatively movable elements forming a working chamber and a reservoir chamber, and having a port therebetween through which fluid is transferred from one chamber to the other chamber in order to dissipate energy, means for metering the flow of fluid through said port and comprising a flexible unit forming an orifice connected to said port and said reservoir chamber, the pressure of the fluid flowing through said orifice flexing said unit and varying in direct proportion the area of said orifice, and an assembly cooperatively associated with said unit and yieldingly resisting at a substantially constant load value flexure thereof increasing the area of said orifice.

7. An hydraulic shock absorber comprising a cylinder, an element therein comprising a wall dividing the cylinder into high and low pressure chambers, a port through said wall connecting said chambers, a piston reciprocal in the high pressure chamber, a metering device associated with said wall and including an adjustable metering orifice connecting said chambers, another cylinder carried by the first-mentioned cylinder and closed from communication therewith, another piston reciprocal within the second-mentioned cylinder and operatively connected to said device for adjusting the area of said orifice, and means including a pressure regulator for conveying pressure fluid to the second-mentioned cylinder under predetermined pressure values and maintaining said pressure values irrespective of reciprocation of the second mentioned piston.

8. An hydraulic shock absorber comprising a cylinder member with a high pressure chamber, a piston member reciprocal therein, a low pressure chamber in one of the members, said one member comprising an element therein including a wall with a port connecting said chambers, a resilient metering unit comprising an axial passage communicating with said port, and radial passage means connecting said passage to the low pressure chamber, a piston and cylinder device carried by said one member and operatively associated with said unit for compressing the same against said wall, and a source of pressure fluid connected to said device for actuation thereof, said source including a relief valve for maintaining the pressure in said device at a preset constant value during the full range of expansion and contraction of said unit.

9. An hydraulic shock absorber comprising a cylinder member with a high pressure chamber adapted to contain hydraulic fluid, a piston member reciprocal in said chamber, a low pressure chamber in one of said members, a pressure sensitive metering unit comprising an assembly defining an adjustable orifice connecting said chamber, said assembly being expansible and contractible to increase and decrease the area of said orifice as the hydraulic pressure therein increases or decreases respectively, yielding means reacting against said unit for resisting expansion of said assembly, and an automatic pressure regulator system operatively connected with said yielding means for maintaining said yielding means at a constant pressure during expansion and contraction of said unit.

10. An hydraulic shock absorber comprising a cylinder member having a high pressure chamber, a piston member reciprocal therein, a low pressure chamber in one of the members, an element carried by said one member with a port therethrough connecting said chambers, a metering device carried by said one member for metering flow of fluid through said port, a cylinder carried by said one member, a piston in said cylinder, said piston being connected to said device to actuate the same, and a source of pressure fluid externally of said cylinder member and operatively connected to said cylinder to actuate said piston.

11. A system of the class described comprising a shock absorber including a cylinder member having a high pressure chamber, a piston member reciprocal therein, a low pressure chamber in one of the members, an adjustable metering orifice connecting said chambers, and a piston and cylinder device carried by said one member and operatively connected to said orifice for adjusting the same, and a pressure system connected to and directing pressure actuating fluid under a predetermined adjustable pressure value to said device for actuation thereof.

12. An hydraulic shock absorber comprising a cylinder including a wall defining high and low pressure chambers therein, a piston reciprocal in the high pressure chamber, a metering mechanism with an adjustable orifice connecting said chambers, a piston and cylinder device carried by the cylinder and operatively connected to said mechanism, the area of said orifice being directly proportional to the pressure in said high pressure chamber, and a pressure system connected to and maintaining pressure actuating fluid in said mechanism under an adjustable predetermined constant pressure value irrespective of movement of the piston of the device into or out of the cylinder of said device.

13. A hydraulic shock absorber comprising a cylinder member with a high pressure chamber adapted to contain hydraulic fluid, a piston member reciprocal in said chamber, a low pressure chamber in one of said members, and metering means carried by said one member including a flexible pressure sensitive orifice expansible and contractible in response to variation in pressure of the hydraulic fluid flow through said orifice, a body of compressed gas operatively associated with said means for yieldingly resisting expansion of said orifice, and means including a constant pressure system connected to said gas for maintaining said gas under substantially constant pressure during expansion and contraction of said orifice.

14. An hydraulic shock absorber comprising a cylinder member having a high pressure chamber, a piston member reciprocal therein, a low pressure chamber in one of the members, an element connected to said one member and having a port connecting said chambers, a metering device carried by said one member for metering flow of fluid through said port, and means including a constant pressure system externally of said cylinder member and operatively connected to said metering device for actuating the same.

15. In a shock absorber having two relatively movable elements forming a working chamber and a reservoir chamber and having a port therebetween through which fluid is transferred from said working chamber to said reservoir chamber to dissipate energy, a flexible metering unit forming an orifice decreasing and increasing in area during flexure of said unit and connected to said port and to said working chamber, a cylinder in said reservoir chamber carried by the adjacent element, a piston within said cylinder projecting from one end thereof and bearing against said unit to control flexing thereof, a closure member carried by said last-mentioned element closing the other end of said cylinder, a fluid supply line connected to said cylinder through said closure member and to a source of pressure fluid, and a relief valve in said line for maintaining the pressure of the fluid in said line and cylinder at a substantially constant predetermined value.

16. In a shock absorber having two relatively movable elements forming a working chamber and a reservoir chamber, and having a port therebetween through which liquid is transferred from said working chamber to said reservoir chamber to dissipate energy on the closure stroke of the shock absorber, a metering unit forming an orifice connected to said port and said reservoir chamber, said unit being contractible and expansible to vary the area of the orifice in accordance with the pressure of the liquid passing through said orifice, means for controlling the expansion of said unit comprising a cylinder carried by one of said elements, a piston within the cylinder projecting from one end thereof and engaging said unit, a closure member closing the other end of said cylinder, a source of pressure fluid connected to said cylinder through said closure member and including means for regulating the pressure of said fluid, by-pass valve means including ports communicating with said chambers, and a valve plate for closing said last-mentioned ports during closure of said shock absorber and for opening the same during extension of said shock absorber.

17. In a shock strut, a cylinder member adapted to contain hydraulic liquid, a sleeve fixed within said cylinder member and having a flange with a port therethrough, said flange dividing said cylinder into high and low pressure chambers, a piston reciprocal within the high pressure chamber, a metering unit mounted in said sleeve within said low pressure chamber and comprising an orifice communicating with said port and said low pressure chamber, said unit being flexible to vary the area of said orifice in accordance with the pressure of liquid flowing from said high pressure chamber through said port and said orifice to said low pressure chamber during closure of said strut, means for controlling flexing of said unit expanding said orifice area comprising fluid-actuated yielding means mounted within said sleeve and cooperatively associated with said unit and including means for connection to a source of pressure fluid externally of said strut, and one-way valve means for accommodating flow of liquid from said low pressure chamber to said high pressure chamber during extension of said strut and including a valve body disposed between said flange and said unit and having openings communicating with said low pressure chamber and said port, said one-way valve means also including a flapper plate disposed between said flange and valve body and movable against said valve body for closing said openings during closure of said strut and movable away from said valve body for opening said openings during extension of said strut.

18. A shock absorber comprising a follower adapted to contain a hydraulic fluid medium, a support structure carried by said follower, an apertured member supported by said structure and dividing said follower into high and low pressure chambers, a piston reciprocal within said high pressure chamber, a cylinder carried by said follower, a piston member in guided engagement with said structure and reciprocal within said cylinder, resilient metering means comprising an orifice connected directly to said low pressure chamber and through said apertured member with said high pressure chamber, said metering means being expansible and contractible to increase and decrease the area of said orifice in accordance with the pressure of the hydraulic medium flowing through said orifice, and conduit means connected to said cylinder and extending externally of said follower for connection to a source of pressure fluid for actuating said piston member against said metering means and the latter against said apertured member for resisting expansion of said metering means, and a source of constant pressure fluid connected to the conduit.

19. A shock absorber comprising two relatively movable elements forming a working chamber and a reservoir chamber and including a wall between said chambers having a port accommodating transfer of fluid from one chamber to the other, a support structure in said reservoir chamber including a perforated tube connected to the adjacent element at one end, a cylinder within said tube at said one end connected to the last-mentioned element, a bearing connected to the other end of said tube, a piston having a stem within the tube and extending into said cylinder at one end for reciprocal movement therein and extending through said bearing at the other end, means connecting said wall to said bearing in spaced relationship thereto, a resilient metering unit between said wall and bearing, a head on said stem between said wall and unit in engagement with the latter, said resilient unit having an orifice connected to said reservoir chamber and said port, said unit being expansible and contractible to vary the area of said orifice in accordance with the pressure of the fluid flowing through said orifice, conduit means connected to said cylinder and extending externally of said device for connection to a source of pressure fluid for actuating said piston for resisting expansion of said unit between said head and said wall, and means connected to said conduit means for regulating the pressure of the fluid supplied to said cylinder whereby the pressure is maintained at a substantially constant predetermined value irrespective of reciprocal movements of said piston during expansion and contraction of said unit.

20. An hydraulic shock absorber comprising a follower adapted to contain hydraulic fluid, a piston member reciprocal in said follower and defining a high pressure chamber with a portion thereof, a low pressure chamber in said follower, an axially expansible and contractible metering unit connecting said chambers comprising a plurality of resilient, radially fluted disks having central openings connected to the high pressure chamber, and means for resisting expansion of said unit comprising a cylinder mounted within said follower, a piston reciprocal within said cylinder, said unit being disposed between said piston and said portion of said follower, and conduit means connected to said cylinder and extending externally of said follower for connection to a source of pressure fluid for actuating said piston against said unit.

21. A shock absorber comprising a cylinder member having a high pressure chamber, a piston member reciprocal therein, a low pressure chamber in one of the members, an adjustable metering orifice connecting said chambers, and a piston and cylinder device carried by said one member and operatively connected to said orifice for adjusting the same, and a pressure system connected to and controlling the pressure value and directing fluid under pressure to said device for actuation thereof, said adjustable metering orifice comprising a port between the high and low pressure chambers and an extension of the piston of said device having a hollow portion forming a tube being axially slotted and fitting into said port.

RAYMOND WATTS.

REFERENCES CITED

The following references are of record in the file of this patent:

UNITED STATES PATENTS

| Number | Name | Date |
|---|---|---|
| 2,059,808 | Robart et al. | Nov. 3, 1936 |
| 2,186,011 | Deport | Jan. 9, 1940 |
| 2,196,094 | Wallace | Apr. 2, 1940 |
| 2,352,351 | Thornhill | June 27, 1944 |
| 2,471,294 | Watts | May 24, 1949 |